(No Model.)
D. A. RITCHIE.
PIPE FORMING MACHINE.
No. 445,202. Patented Jan. 27, 1891.
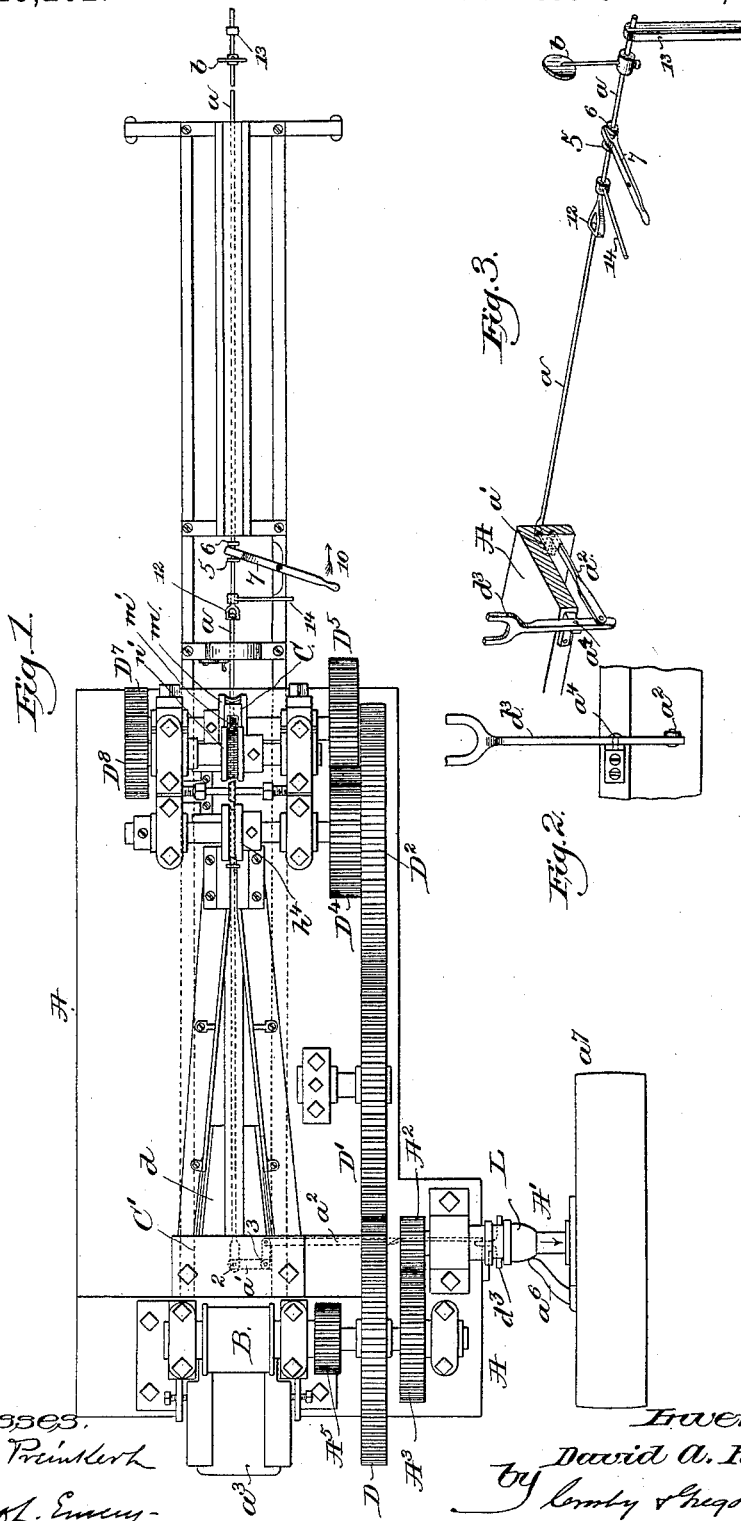

UNITED STATES PATENT OFFICE.

DAVID A. RITCHIE, OF CAMBRIDGE, MASSACHUSETTS.

PIPE-FORMING MACHINE.

SPECIFICATION forming part of Letters Patent No. 445,202, dated January 27, 1891.

Application filed November 15, 1889. Serial No. 330,472. (No model.)

*To all whom it may concern:*

Be it known that I, DAVID A. RITCHIE, of Cambridge, county of Middlesex, State of Massachusetts, have invented an Improvement in Pipe-Forming Machines, of which the following description, in connection with the accompanying drawings, is a specification, like letters and figures on the drawings representing like parts.

This invention has for its object to provide a machine substantially such as represented in United States Patent No. 328,974, granted to me October 27, 1885, with a stop-motion, whereby when a tube of a certain length has been made the machine will be automatically stopped.

The particular features in which my invention consists will be pointed out in the claims at the end of this specification.

Figure 1 of the drawings is a plan view of a portion of a machine for making metal tubing such as described in the said patent with my present improvements added thereto, and Fig. 2 is a detail to be referred to. Fig. 3 is a detail showing the stop, the rod, lever, and other devices by which to actuate the cone.

Referring to the drawings, the bed-plate A, the driving-shaft A′, the gearing $A^2$ $A^3$ $A^5$ D D′ $D^2$ $D^4$ $D^5$ $D^7$ $D^8$, the feed-rolls B, the rolls $n'$ $m$ $m'$, the mandrel C, the plate $a^3$, constituting part of the receiving-guide, the crown-plate $d$, and the parts co-operating with the said rolls and mandrel to form sheet-metal pipes are all substantially as in the patent referred to.

In accordance with my invention I have provided the machine at a point below the mandrel with a shipper-rod $a$, joined at 2, as shown by dotted lines, to an elbow-lever $a'$, pivoted at 3, and connected by a link $a^2$ with an upright forked lever $d^3$, herein shown as pivoted at $a^4$, the said fork entering an annular groove in the collar or hub of a clutch L, of any approved construction, on the shaft A′, the said clutch when pushed upon the said shaft in the direction of the arrow thereon in Fig. 1 far enough to act upon the finger or lever $a^6$, as shown in Fig. 1, serving to actuate the friction device between the said shaft and the belt or driving wheel $a^7$, so that the said clutch thereafter runs loose on the said shaft, stopping the action of the machine.

The clutch and the lever referred to are common to what is known as the "Blake clutch," represented in United States Patent No. 348,612, where the cone and lever are designated by like letters L and H, to which reference may be made; but instead of the particular clutch described I may employ any other usual friction-clutch mechanism between the main shaft and the belt-pulley $a^7$, so that by the longitudinal movement of a collar or equivalent on the shaft the pulley may be freed from or secured to the said shaft at will.

The rod $a$ at its end outside the machine in the direction of the feed of the pipe being made has secured to it a stop $b$, which may be adjusted upon the rod in any usual manner. In the drawings the said rod is shown as broken out to shorten the same.

The rod referred to has two collars 5 6, between which works a suitable lever 7, which may be turned on its fulcrum to move the rod $a$ and effect the engagement of the driving-pulley with the shaft A′ or to effect its disengagement therefrom to start or stop the machine.

In the drawings it is supposed that a piece of pipe has struck the stop at $b$ and has effected the disengagement of the driving-pulley $a^7$ and that the machine is at rest.

To start the machine, the lever 7 will be moved in the direction of the arrow 10 next to it, the said lever then acting upon the collar 5.

The rod $a$ is shown as made in two parts, connected by a turn-buckle 12, the said turn-buckle being used to enable the outer portion of the rod containing the stop $b$ to be turned about its center to place the stop $b$, when desired, out of the range of movement of the pipe, the extreme outer end of the rod being guided in a bearing 13. To turn this rod, it is provided with a handle 14, secured thereto, as shown, near the turn-buckle.

Prior to my invention I am not aware that a machine for making pipe has ever been provided with a stop and with a friction-pulley upon its driving-shaft, so that when the pipe strikes the said stop, a certain length having been made, the machine will be stopped. So I do not desire to limit my invention to the exact form of connecting mechanism between the said stop, as $b$, and the clutch mechanism employed between the main shaft of the machine, as A', and the belt-pulley $a^7$, as instead of the particular devices shown I may employ any other well-known equivalent devices; and so, also, while I prefer to use the mechanism shown and described in the said Patent No. 328,974 for the manufacture of pipe, yet I do not desire to limit my invention to the machine herein shown and referred to, as my invention is equally applicable to any machine for manufacturing pipe in which it is possible to utilize the pipe to actuate the stop-motion.

I claim—

1. In a pipe-forming machine, means to feed the pipe as it is formed, driving mechanism therefor, and a stop-motion comprising a rod having a stop arranged in the path of travel of the pipe, and connections between said rod, and means, such as a friction-clutch, to stop the motion of the driving mechanism, substantially as described.

2. The shaft A', a friction-clutch, the lever 7, the elbow-lever $a'$, the link $n^2$, the rod $a$, combined with the stop $b$ thereon, adapted to be struck by a pipe when it is desired to move the said cone in one direction upon the said shaft, substantially as described.

3. In a pipe-forming machine, a stop-motion comprising a rod having a longitudinal motion and made in two parts which are connected by a turn-buckle, a stop on said rod, and a lever for rotating said rod to turn its stop into and out of the path of movement of the pipe, substantially as described.

In testimony whereof I have signed my name to this specification in the presence of two subscribing witnesses.

DAVID A. RITCHIE.

Witnesses:
GEO. W. GREGORY,
B. DEWAR.